United States Patent [19]

Iura et al.

[11] Patent Number: 4,488,800
[45] Date of Patent: Dec. 18, 1984

[54] PHOTOGRAPHING MODE DISPLAY DEVICE OF A CAMERA

[75] Inventors: Yukio Iura, Kanagawa; Masami Shimizu, Tokyo; Hiroshi Aizawa, Kanagawa; Tokuichi Tsunekawa; Masanori Uchidoi, both of Yokohama; Masayoshi Yamamichi, Kanagawa, all of Japan

[73] Assignee: Canon Kabushiki Kaisha, Tokyo, Japan

[21] Appl. No.: 121,104

[22] Filed: Feb. 13, 1980

Related U.S. Application Data

[63] Continuation of Ser. No. 949,560, Oct. 10, 1978, abandoned, which is a continuation of Ser. No. 763,099, Jan. 27, 1977, abandoned.

[30] Foreign Application Priority Data

Feb. 4, 1976 [JP] Japan .................................. 51-11001

[51] Int. Cl.³ ............................................. G03B 7/085
[52] U.S. Cl. .................................... 354/445; 354/455; 354/469; 354/471
[58] Field of Search ....................... 354/37, 38, 41, 43, 354/46, 47, 53, 60 R, 60 E, 60 L, 57, 60 A

[56] References Cited

U.S. PATENT DOCUMENTS

3,703,130  11/1972  Watanabe ............................. 354/24
4,015,198   3/1977  Iwashita et al. .................. 354/43 X
4,045,807   8/1977  Ito et al. .......................... 354/47 X

Primary Examiner—Michael L. Gellner
Attorney, Agent, or Firm—Toren, McGeady & Stanger

[57] ABSTRACT

Object brightness information is measured and diaphragm aperture value is appex operated using the setting information of mounted lens and the photographing conditions an input to effect ON-OFF control of an automatic-manual change-over means. The change-over means is associated with the photographing mode change-over operation of a diaphragm setting means for displaying the photographing mode within a finder.

36 Claims, 4 Drawing Figures

PHOTOGRAPHING MODE DISPLAY DEVICE OF A CAMERA

This is a continuation of application Ser. No. 949,560, filed Oct. 10, 1978, which is a continuation of application Ser. No. 763,099, filed Jan. 27, 1977, both abandoned.

BACKGROUND OF THE INVENTION

Heretofore a photographing mode display device for providing an automatic photographing-manual photographing change-over lever at an upper part of a camera main body for displaying the automatic photographing or the manual photographing within a finder by changing over said lever has been publicly known.

This conventional device has the advantages of good handling characteristics, said change over of the automatic photographing and the manual photographing can be made by handling the lever only and further, since the camera has a comparatively non-complicated mechanical set up and said lever and a finder have comparatively close positional relationship therebetween. However, on the other hand, it has shortcomings in practical handling characteristics since double handlings are required in a manual photographing so that after the lever is once changed over to manual photographing side, a diaphragm ring on a photographing lens must be handled to set the diaphragm aperture. Such display device has also been proposed to eliminate such shortcomings that a diaphragm ring which can set an automatic photographing mode and a manual photographing mode is provided, at the same time, a mechanical coupling member which couples a display member within a finder and the diaphragm ring is provided for displaying the automatic photographing mode and the manual photographing mode within a finder through said mechanical coupling member in an association with the change-over action of the diaphragm ring. But in the case of the latter device, as change-over action is performed from the automatic photographing mode to the manual photographing mode, the diaphragm aperture information will automatically enter into the control device of a camera in an association with said action. The double action of the change over lever action and the diaphragm aperture setting action as in the former display device mentioned earlier is not required on the camera thus having good handling characteristics. But this latter device has the shortcoming that it requires a mechanical coupling member to couple the diaphragm ring and the display member provided at the finder part for displaying a photographing mode within a finder, thus complicating the set up of a camera.

BRIEF SUMMARY OF THE INVENTION

The present invention relates to a photographing mode display device of a camera to display the photographing mode, i.e. whether it is in an automatic photographing mode or a manual photographing mode within a finder.

To describe the same in detail the present invention is to provide a photographing mode display device having a simple set up and having good handling characteristics in the handling of an automatic-manual change-over means.

Further, the present invention is to provide a display device to give a warning on falling on outside of a photosensing zone of a camera.

Moreover, the present invention is to provide a display device to give a low brightness warning to inform a photographer that an object brightness is at a low level.

The above mentioned and other objects of the present invention as well as its unique characterizing features will be made completely clear by reading the following detailed explanations in reference with the attached drawings. But the drawings are solely for explanations and are not intended to limit the scope of the present invention.

DETAILED DESCRIPTION OF THE INVENTION

The present invention is to change over a camera having a mode display means for automatic-manual photographing modes within a visible zone of a camera to an automatic or a manual photographing mode so that the manual photographing mode display means is activated at a time of manual photographing mode to have a photographer see the manual photographing mode while the exposure information is displayed within a finder at a time of automatic photographing mode for displaying the automatic photographing mode, and now the invention will be explained in detail referring to the drawings.

Figure 1:
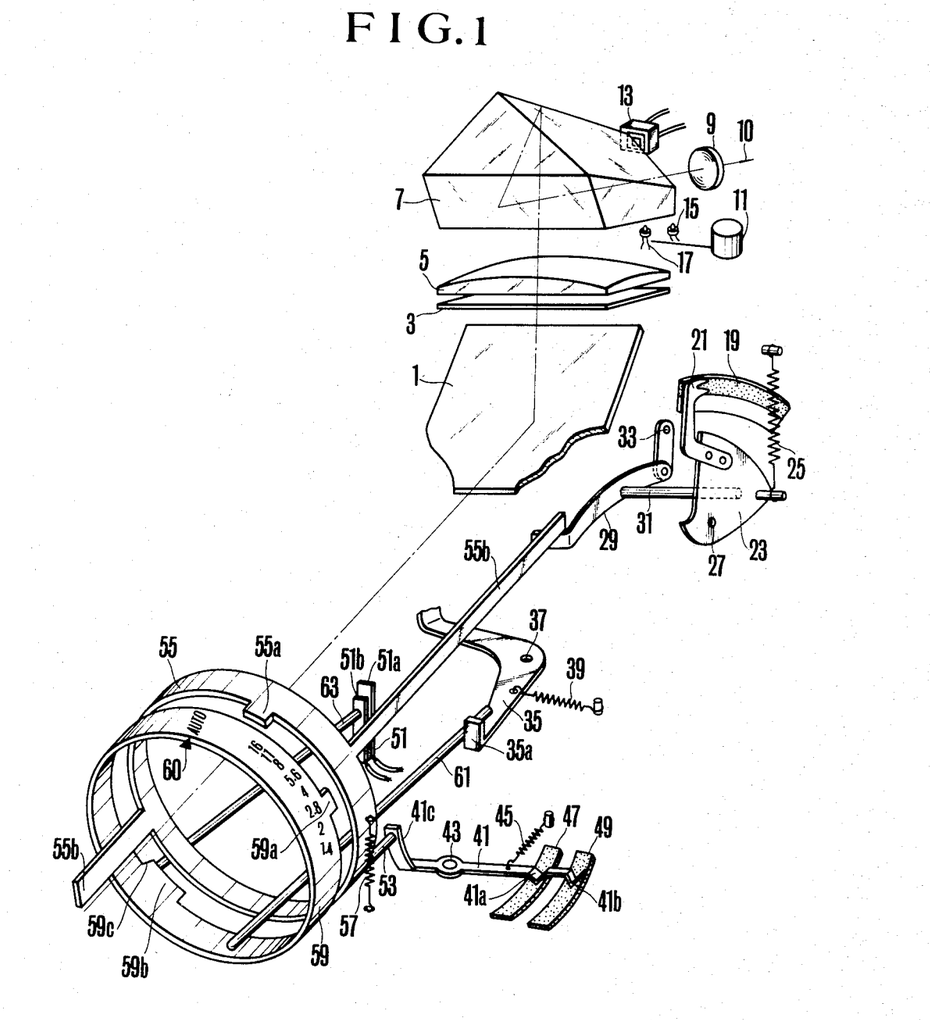
FIG. 1 is a set up drawing to show a principle of the present invention as it is applied to a camera.
Figure 3:
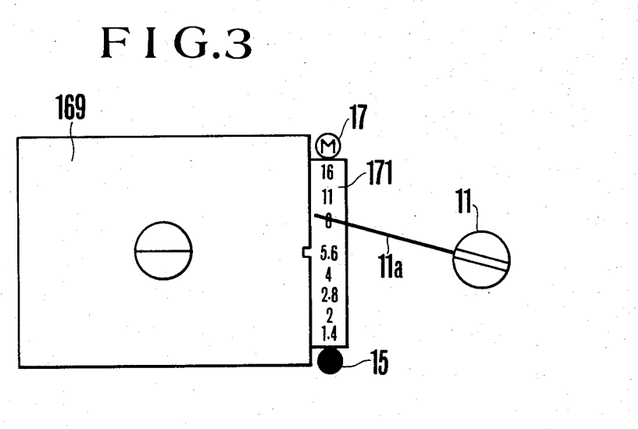
FIG. 3 is a drawing to show a finder part of a camera according to the present invention.

FIG. 1 is to show a basic set up drawing of a camera to which the display device of the present invention is applied, wherein what is shown as 1 is a quick return mirror, 3 is a focusing plate, 5 is a condensor lens provided on the focusing plate, 7 is a pentagonal prism, 9 is an eye piece lens, 11 is an exposure display meter, and 13 is a photo-diode as a light receiving element, wherein said photo-diode 13 is placed at such position as receiving the incident light beam 10 which comes from object after being reflected by the mirror 1 and penetrating through the focusing plate 3, the condenser lens 5 and the pentagonal prism 7. What is shown as 15 is a low brightness warning light emission diode and 17 is a light emission diode to display a manual photographing mode, and these light emission diodes 15, 17 are provided within a finder in a displayable manner as shown in FIG. 3. What is shown as 19 is a diaphragm aperture setting variable resistance, and 21 is a sliding piece which is slidingly contacting with the resistance 19, and the other end of said sliding piece 21 is fixedly provided on the end part of a sector gear. What is shown as 25 is a spring to bias the sector gear 23 to give it a rotating tendency to counter-clockwise direction, and 27 is a rotation axle of the sector gear 23, while 29 is a signal lever, wherein said lever 29 and the sector gear 23 are coupled with each other by a coupling bar 31 which is fixed to each of the same. What is shown as 33 is a rotation axle of the signal lever 29, and 35 is an automatic diaphragm lever and is so made as normally rotating to counter-clockwise direction by a spring 39 around a rotation axle 37. What is shown as 41 is a correction lever axially supported at a rotation axle 43, and sliding pieces 41a, 41b which are slidingly contacting with resistances 47, 49 are provided at an end part of said lever 41. What is shown as 45 is a spring to bias the correction lever 41 to give the same rotating force to counter-clockwise direction, and 47 is a resistance to input fully opened F value (hereinafter called as Avo) information of a photographing lens used, while 49 is a resistance to input a correction information (hereinafter called Avc) for a photographing lens, and what is shown as 51 is a change over switch for automatic photographing mode and manual photographing mode, having a fixed contact 51a and a movable contact 51b. The parts mentioned above are provided within a camera main body. What is shown as 53 is a correction pin, which has an end part which pressure contacts with an end part 41c of the correction lever 41 when a photographing lens is mounted to a camera body. What is shown as 55 is a diaphragm driving ring and has a projection 55a, and is normally given a rotating characteristics to clockwise direction by a spring 57. What is shown as 59 is a diaphragm preset ring and has a projection 59a, wherein an automatic photographing mode mark AUTO and plural number of diaphragm aperture marks for manual photographing mode are punchedly provided on said diaphragm preset ring 59 as shown in FIG. 1. In FIG. 1 the diaphragm aperture marks from 16 to 1.4 are shown for a purpose of easiness in understanding. What is shown as 60 are marks and 61 is a pin coupled to diaphragm blades not being shown in the drawing, and one end of said pin is so provided as can contact with a bent part 35a of the automatic diaphragm lever 35. What is shown as 63 is a pin having an end part contacting with a movable contacting piece 51b of the change over switch 51.

Figure 2:
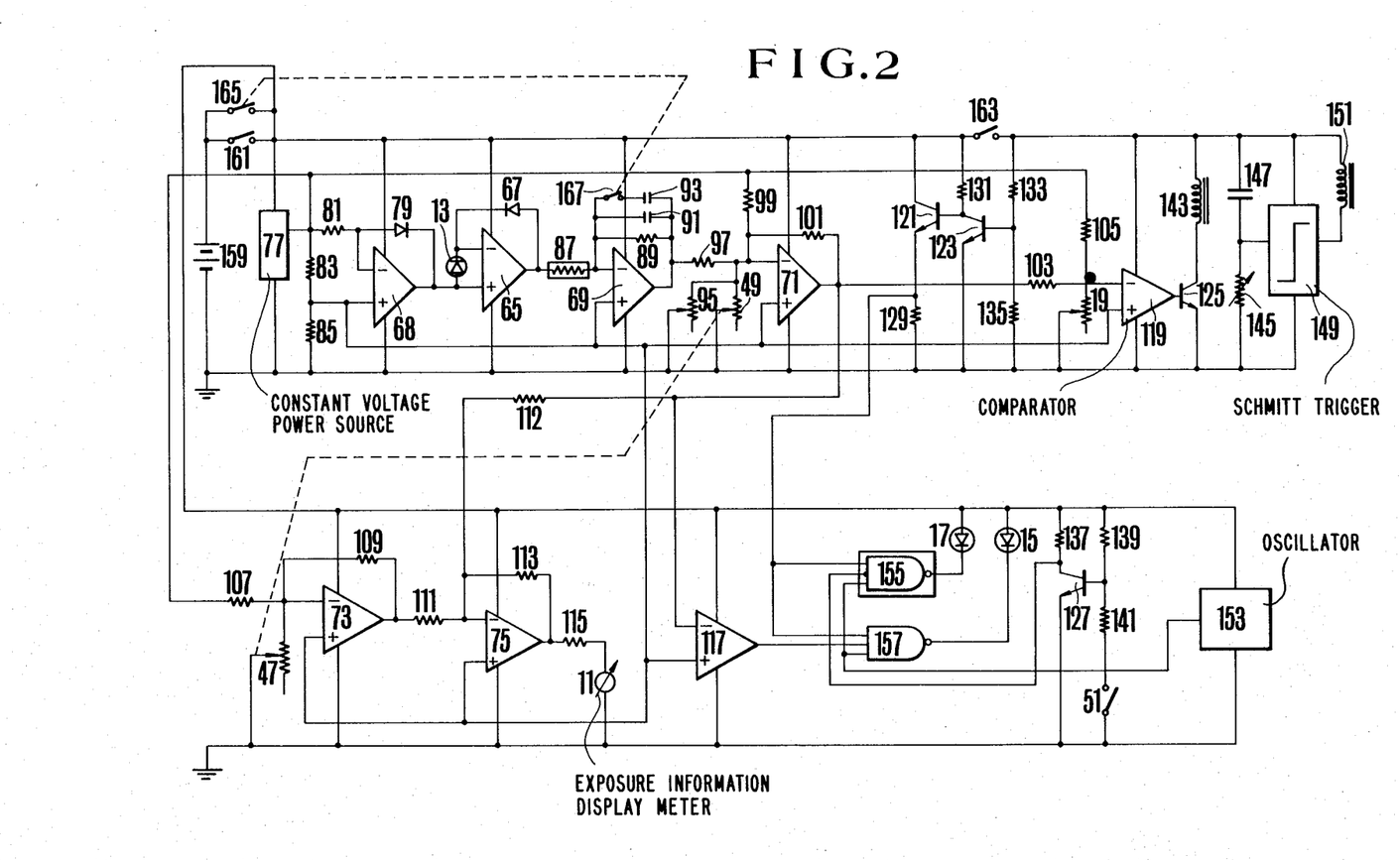
FIG. 2 is an electric circuit connection diagram to show an example of the present invention.

FIG. 2 is a connection diagram of an electric circuit of a camera shown in FIG. 1. Now while explanations will be made on FIG. 2, same elements as shown in FIG. 1 will be identified with same numbers and symbols and explanations therefor will be omitted.

In FIG. 2, what is shown as 65 is a photosensing operation amplifier having high input impedance and the output terminal of the above mentioned photo-diode 13 is connected between two input terminals of said amplifier 65, while a diode 67 to logarithmically compress the photo-current is connected between its input and output terminals. What are shown as 68, 69, 71, 73, 75 are operation amplifiers respectively. What is shown as 77 is a constant voltage power source for setting a bias level, while 79 is a temperature compensation diode connected between input and output terminals of the operation amplifier 68, and what is shown as 81 is a resistance connected between output terminal of the constant voltage power source 77 and an inversion input terminal of the amplifier 68. What is shown as 83 is a resistance connected between the output terminal of the constant voltage power source 77 and a non-inversion input terminal of the amplifier 68, and what is shown as 85 is a resistance connected between a non-inversion input terminal of the amplifier 68 and the grounding thereof. Here said parts 68, 77, 79, 81, 83 and 85 constitute a temperature compensation circuit, which is so made that such current as being equal to the photo-current generated at the photo-diode 13 flows to the temperature compensation diode 79 by the action of the resistance 81 in the reference brightness within the brightness range to have temperature compensation.

What is shown as 87 is a temperature compensation resistance element having a positive temperature coefficient, and what are shown as 89, 91 and 93 constitute a prevention circuit to prevent a flicker noise by such light source as a fluorescent lamp to illuminate an object when a light receiving element 13 have a very high speed response characteristics, wherein 89 is a resistance connected between the input and output terminals of the amplifier 69, while 91 and 93 are capacitors. What is shown as 95 is a variable resistance at which such information as deducting the shutter time information (Tv) from the film sensitivity information (Sv), that is (Sv−Tv) is set, while what are shown as 97, 99 are resistances connected between the inversion input terminals of the amplifier 71, and what is shown as 101 is a resistance connected between the input and output terminals of the amplifier 71. What is shown as 103 is a resistance connected between the output terminal of the amplifier 71 and the inversion input terminal of a comparator 119, and what is shown as 105 is a resistance, while what is shown as 107 is a resistance connected to the inversion input terminal of the amplifier 73. What is shown as 109 is a resistance connected between the input and output terminals of the amplifier 73, and what is shown as 111 is a resistance connected to the output terminal of the amplifier 73 and the inversion input terminal of the amplifier 75, while what is shown as 112 is a resistance. What is shown as 113 is a resistance connected to the input and output terminals of the amplifier 75, while what is shown as 115 is a resistance connected between the output terminal of the amplifier 75 and the exposure information display meter 11. What are shown as 117, 119 are comparators, and what are shown as 121, 123, 125, 127 are npn type transistors, while what is shown as 129 is a resistance connected to the emitter electrode of the transistor 121. What is shown as 131 is a resistance connected to the collector electrode of the transistor 123, and what are shown as 133, 135 are resistances connected to the base electrode of the transistor 123, while what is shown as 137 is a resistance connected to the collector electrode of the transistor 127. What are shown as 139, 141 are resistance connected to the base electrode of the transistor 127, and what is shown as 143 is a diaphragm control magnet, while what are shown as 145, 147, 149, 151 constitute a shutter time setting circuit, wherein 145 is a shutter time setting resistance, and 147 is a time constant capacitor, while 149 is a Schmitt trigger circuit connected to the output terminals of the time constant circuit 145, 147. What is shown as 151 is a shutter time control magnet, and what is shown as 153 is an oscillator to generate pulses of a prescribed frequency, while what is shown as 155 is a NAND circuit, wherein the first input terminal of said NAND circuit 155 is connected to the emitter electrode of the transistor 121, and the second input terminal is connected to the collector electrode of the transistor 127, while the third input terminal thereof is connected to the output terminal of the oscillator 153, and said output terminal is connected to the light emission diode 17 for manual photographing mode display. What is shown as 157 is a NAND circuit, and the first input terminal of said NAND circuit 157 is connected to the emitter electrode of the transistor 121, and the second input terminal thereof is connected to the output terminal of the comparator 117, while the third input terminal thereof is connected to the output terminal of the oscillator 153. Also a display circuit is constituted by 15, 17, 51, 127, 137, 139, 141, 153, 155,

157. What is shown as 159 is a power source battery, and 161 is a normally opened type of photo-sensing display switch being associated with a shutter button not being shown in the drawing and being closed by first step pressing down of said button. What is shown as 163 is a normally opened type of exposure control switch being closed in an association with the second step pressing down of a shutter button, and what are shown as 165, 167 are normally opened type switch in an associated relationship, respectively showing flicker prevention switches being closed as photographing is done under a flickering light source such as a fluorescent lamp and a mercury lamp, etc.

FIG. 3 is to show a state of inside of a finder of a camera shown in FIG. 1, and what is shown as 169 is an object field of vision part, wherein a diaphragm aperture value display plate 171 is provided at a right side edge of said field of vision part, and the above mentioned light emission diode 17 for displaying manual photographing mode is projected at the upper end part of said display plate 171, and on the other hand the above mentioned low brightness warning light emission diode 15 is projected at the lower end part thereof. Also a pointer 11a of a meter 11 is visibly provided on the diaphragm aperture value display plate 171.

Next, explanations will be made on the function of a camera having the above mentioned set up using FIGS. 1 to 3.

First, when a photographing lens is mounted on a camera main body, the correction pin 53 presses a riser part 41c of the correction lever 41 and rotates the correction lever 41 to clockwise direction resisting the spring 45. Since the sliding pieces 41a, 41b slide on the resistances 47, 49 as the correction lever 41 rotates, the Avo information of a photographing lens is set at the resistance 47 and the Avc information of a photographing lens is set at the resistance 49.

Next, as a shutter button is pressed down, the photo-sensing display switch 161 is closed and power supply is done to each circuit. And as a camera is pointed toward an object, the luminous flux from an object penetrates through the photographing lens as shown in FIG. 1 and is reflected at the mirror 1, then penetrates through each of the optical systems of the focusing plate 3, the condenser lens 5, and the pentagonal prism 7 and impinges into the light receiving element 13. When the luminous flux 10 from an object is incident into the light receiving element 13, said luminous flux is converted into photo current by the light receiving element 13 and is logarithmically compressed by the diode 67, then appears as the electric signal at the output terminal of the amplifier 65. Since the photographing lens is not stopped down at all at this time, the information (Bv−Avo−Avc) deducting the Avo information of the mounted photographing lens and the Avc information thereof from an object brightness information (Bv) is outputted. Said information (Bv−Avo−Avc) generated at the output terminal of the operation amplifier 65 is operated by the amplifier 71 through a flicker prevention circuit. Here, since the Avc information is set at the resistance 49 and the (Sv−Tv) information is set at the resistance 95, such electric signal as corresponding to (Bv+Sv−Tv−Avo)=(Av−Avo) information, that is such electric signal as corresponding to the information of the number of steps to be stopped down from the fully opened position of the mounted photographing lens will be outputted at the output terminal of the operation amplifier 71. Said output signal (Av−Avo) of the amplifier 71 is operated at the operation amplifier 75 together with the Avo information which is the output signal from the operation amplifier 73, then is outputted from the output terminal of the amplifier 75 as the absolute value information (hereinafter called as Av) of diaphragm aperture. Therefore, the pointer 11a of the meter has a photographer visually recognize such diaphragm value as based on the output signal of the amplifier 75. Also the output signal of the operation amplifier 71 is compared by the comparator 117, and when said output signal is below the reference value, that is when the output signal (Av−Avo) of the operation amplifier 71 is below the maximum aperture value of the photographing lens used, the output of the comparator 117 is inversed and the electric potential at the second input terminal of the NAND circuit 157 is made to have a high level (hereinafter called as "1") for giving a warning that said output signal falls outside of an associating scope. On the other hand in a state wherein a shutter button is pressed down only by one step the transistor 123 is in OFF state and the transistor 121 is in ON state, therefore the potential at the first input terminal of the NAND circuit 157 becomes "1".

Therefore, as the output signal of the comparator 117 is "1", the light emission diode 15 is flickered by the oscillating frequency of the oscillator 153 to have a photographer visually recognize that it is outside of the associating scope. Also when the mark AUTO and the mark 60 of the diaphragm preset ring 59 are matched as shown in FIG. 1 under said state, as the pin 63 presses the movable contacting piece 51b of the switch 51, the change over switch 51 is placed in a closed state, thus the transistor 127 is placed in OFF state and the second input terminal of the NAND circuit 155 becomes to have low level (hereinafter called as "0"), therefore, the light emission diode 17 will not emit light, thus informing a photographer that the camera is in an automatic photographing mode.

On the other hand, when the diaphragm preset ring 59 is rotated to have the mark 60 match with any one of the diaphragm aperture values on the ring 59, the projection 59b on the diaphragm preset ring 59 shifts to right direction, and the pin 63 retreats along the slanted part 59c of the projection 59b, discontinuing the pressing of the movable contacting piece 51b of the switch 51, therefore the switch 51 is placed in an opened state and the second input terminal of the NAND circuit will become "1". Therefore, the output terminal of the NAND circuit 155 becomes "0" and the light emission diode 17 is flickered with the oscillating frequency of the oscillator 153 to have a photographer visually recognize that a camera is at a manual photographing mode through the finder. Of course in said manual photographing mode when the diaphragm preset ring 59 is rotated to change it to a manual photographing mode, the diaphragm information in manual mode can be inputted into a camera as will be described below. Thus such double handling of the mode change over handling and the diaphragm setting handling as in a conventional device will not be needed.

As a shutter button is further pressed down, the switch 163 is closed, and the transistor 123 becomes ON, while the transistor 121 becomes OFF, therefore the first input terminals of the NAND circuits 155, 157 become "0", and the low brightness warning light emission diode 15 and the light emission diode 17 for displaying manual photographing mode are put off, thus saving the power consumption at a time of exposure control of camera, and at a same time the diaphragm value setting action and the shutter time setting action will be done as will be explained below.

That is, as a shutter button is pressed down to a second step, the sector gear 23 releases the checking of a checking lever, which is not shown in the drawing but is to check the sector gear 23, and is rotated to counter clockwise direction by a spring 25, then a sliding piece 21 slides on the resistance 19. Also as the sector gear 23 rotates the signal lever 29 rotates to counter-clockwise direction. On the other hand, as the diaphragm driving ring 55 is biased by the spring 57 to have a rotating force to clockwise direction, it follows the rotation of the signal lever 29, and rotates, while detecting the shifting of the signal lever 29 by the arm 55b on the same. Also the automatic diaphragm lever 35 is rotated to clockwise direction by a member not being shown in the drawing resisting the spring 39 and drives the diaphragm blades through the pin 61. The diaphragm signal on the resistance 19 being set by the rotation of the sector gear 23 is compared by the comparator 119 with the (Av−Avo) information from the amplifier 71, and as the comparator 119 is inversed, the transistor 125 is placed in OFF state while the magnet 143 is demagnetized, and a checking member not being shown in the drawing but being coupled to the magnet 143 checks the rotation of the sector gear 23. When the rotation of the sector gear 23 is checked, the rotation of the diaphragm driving ring 55 is also checked by the signal lever 29 and the action of the diaphragm blades is also stopped, thus the diaphragm aperture of the photographing lens is set at such value as giving appropriate exposure.

On the other hand, the shutter time control circuit starts counting by up action of the mirror 1, and after an elapse of such shutter time as set at the resistance 145, the magnet 151 is demagnetized to run a shutter follower screen to complete exposure.

While the above explanations cover the action in a case of an automatic photographing mode, explanations will be made next on the action in a manual photographing mode.

First, when a desired diaphragm aperture value on the diaphragm preset ring 59 is matched with the mark 60, the pin 63 comes off the projection 59b, thus placing the change over switch 51 in OFF state, and when the switch 161 is made ON by a shutter button, the photo-sensing circuit is placed in an active state as in the above mentioned case. As the shutter button is further pressed down, the gear 23 is rotated by the spring 25 to counter clockwise direction, thus the signal lever 29 is shifted downward through the coupling bar 31. Therefore, the diaphragm driving ring 55 which has the arm 55b checked with the signal lever 29 is rotated by the spring 57 to the position of the projection 59a of the diaphragm preset ring 59. By this the diaphragm driving ring 55 is rotated to the position of the set diaphragm aperture value, thereby determining the position of the bell crank.

Also at the same time an automatic diaphragm mechanism is started. That is the automatic diaphragm lever 35 is rotated by a member not being shown in the drawing to clockwise direction to conduct the stopping down of the diaphragm as in the above case. Also the mirror 1 jumps up in an association with the pressing down of the shutter button and the shutter time control is done as in the above case.

Further when the pointer 11a of the meter 11 of the camera is at a fully opened side than the fully opened F value of the photographing lens that is at an over side, the output of the operation amplifier 71 becomes below zero in Appex value, thus the low brightness warning light emission diode 15 is flickered to give a warning to a photographer.

In FIG. 2 at a time of manual photographing mode, the photographing mode change over switch 51 is placed in OFF state and an armature (not being shown in the drawing) of the diaphragm control magnet 143 is mechanically checked by a checking member not being shown in the drawing, therefore even if the diaphragm control magnet 143 becomes ON, the rotation of the sector gear 23 will not be checked and the diaphragm is set at a preset value by the diaphragm preset ring 59.

Figure 4:
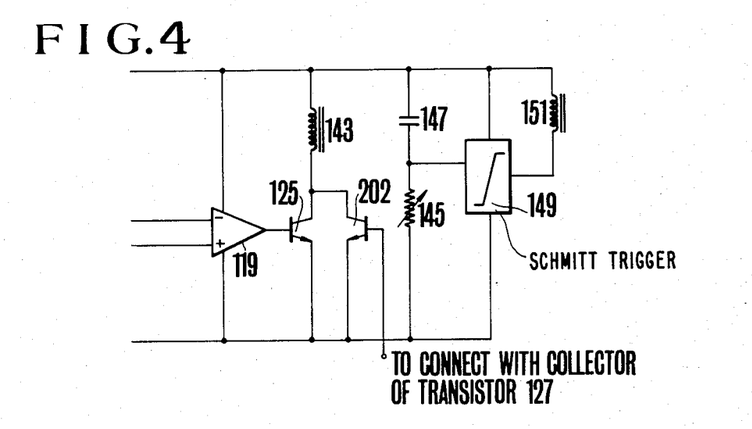
FIG. 4 show important parts of electric circuit connection diagrams to show other examples of the present invention.

FIG. 4 shows such method that the diaphragm control magnet 143 is magnetized at a time of manual photographing mode, being contrary to FIG. 2, and the armature is electrically retained, and the rotation of the sector gear 23 is not checked. In FIG. 4, the shutter time setting circuit and the part at which it is added in FIG. 2 will be shown. Other circuits are same as those in FIG. 2.

In FIG. 4, what is shown as 202 is a transistor having its base connected to the collector of the transistor 127. The collector of the transistor 202 is connected to the connecting point between the diaphragm control magnet 143 and the collector of the transistor 125. The transistors 201, 202 in FIG. 4 are npn type transistors.

In FIG. 4, when the change over switch 51 becomes ON, the transistor 127 becomes ON, and as the collector of the transistor 127 and the base of the transistor 202 are connected the transistor 202 becomes ON, thus current continues to flow to the diaphragm control magnet 143 regardless of inversion or non-inversion of the comparator 119, retaining the armature, thereby the rotation of the sector gear 23 is not checked and the diaphragm aperture is set at the value preset by the diaphragm preset ring 59.

Also when stopped down photo-sensing is done in this camera using a photographing lens without a correction pin 53, since Avo information and Avc information are not inputted into the camera, the output of the operation amplifier 69 becomes (Bv−Av) information, and said information and the (Sv−Tv) information set at the resistance 95 are operated at the amplifier 71. And when the result of said operation is to give appropriate exposure, the output of the operation amplifier 71 becomes zero. Therefore in order to obtain appropriate exposure in said photographing lens, the meter 11 needs to be used in a zero method.

As has been mentioned above according to the present invention handling characteristics are improved and an automatic photographing mode and a manual photographing mode are displayed by actuating an electric display circuit by said switch, thus its set up can be simplified.

As has been mentioned above in the present invention by change over into a manual photographing mode or an automatic photographing mode, a manual mode state warning means is activated at a time of manual mode, flickering light emission is done by a light emission means, while exposure information is displayed at a time of an automatic photographing mode. While explanations of the present invention have been made on such example of a camera which can make shutter time preference photographing, a camera which can conduct so-called both preference photographing in which either one of the shutter time or diaphragm value information can be preferentially inputted and set is well known, thus the present invention can naturally be applied to said both preference camera.

What is claimed is:

1. A photographic camera having a photographing mode display device and an interchangeable lens, having the following arrangement:
   (a) an interchangeable lens having a diaphragm device and having a signal means for showing a signal containing fully open aperture value information of the lens; and
   (b) a camera having a photographing mode display device which is adapted to have said interchangeable lens mounted thereon, comprising:
      (1) a light measuring circuit for measuring light received from an object to be photographed;
      (2) exposure condition setting means for supplying film sensitivity information and shutter time information;
      (3) diaphragm aperture value computing means for computing information concerning the number of steps by which said interchangeable lens mounted on the camera should be stopped down from the fully open aperture position thereof based on the exposure condition setting information from the exposure condition setting means;
      (4) diaphragm control means for controlling the operation of the diaphragm device corresponding to the computed value output of the diaphragm aperture value computing means;
      (5) reference signal producing means which produces a reference signal;
      (6) comparison means which compares the output of said diaphragm aperture value computing means with said reference signal and produces an electrical signal by determining whether or not the signal from said computing means is less than zero; and
      (7) warning means for giving a warning relative to photographic information, said warning means being connected to said comparison means to display by illumination said warning when a photographic condition based on the output signal of said comparison means falls outside an associated range of the camera in response to a photo taking action of the camera.

2. A photographic camera in accordance with claim 1, further comprising:
   (a) an absolute diaphragm aperture value output means, said output means responsive to the output of the diaphragm aperture value computing means and the information of the fully open F value of the lens for producing the information of the absolute diaphragm aperture value; and
   (b) diaphragm aperture display means, said means being supplied with the absolute diaphragm aperture value from the absolute diaphragm aperture value output means for displaying the diaphragm aperture value.

3. A photographic camera in accordance with claim 2 wherein the diaphragm aperture value display means is a meter.

4. A photographic camera in accordance with claim 3 wherein the display pointer of the meter is arranged to be visually recognizable in the view finder having a scale of the diaphragm aperture value.

5. A photographic camera in accordance with claim 1 wherein the light measuring circuit constituting the photographing mode display device includes a temperature compensating circuit.

6. A photographic camera in accordance with claim 1 wherein the light measuring circuit constituting the photographing mode display device further includes a flicker preventing circuit.

7. A photographic camera according to claim 1, wherein said warning means is provided with a warning display means comprising:
   (a) oscillation means, said oscillation means producing a pulse of a certain determined frequency;
   (b) switching means for controlling current supply to each means of the camera in response to an action for bringing the camera into an operative state, and which generates a warning signal in response to closing action of the switching means;
   (c) a first logic circuit, said circuit being supplied with the outputs of the comparison means, the switching means and the oscillation means for producing a signal when the output signal of each means has entered into a certain determined logic state; and
   (d) first display means, said means displaying the signal of the logic circuit in synchronism with the frequency of the oscillation means.

8. A photographic camera having a photographing mode display device comprising:
   (a) oscillation means, said oscillation means producing pulses of a certain determined frequency;
   (b) a first logic circuit, said circuit being supplied with the outputs of the comparison means, the switching means and the oscillation means to produce a signal when the output signal of each means has entered into a certain determined logic state; and
   (c) first display means, said means displaying the signal of the logic circuit in synchronism with the frequency of the oscillation means,
   wherein the first display means is a light emitting diode (LED).

9. A photographic camera in accordance with claim 8 wherein the light emitting diode (LED) is arranged in the view finder in such a manner that the light emitting state of the diode is visually recognizable.

10. A photographic camera having a photographing mode display device comprising:
   (a) a photographic lens having a diaphragm device and a signal means representing the fully open F value of the aperture of the lens;
   (b) a light measuring circuit for measuring light received from an object to be photographed;
   (c) exposure condition setting means for supplying film sensitivity information and shutter time information;
   (d) diaphragm aperture value computing means, said means being supplied with signals from said light measuring circuit and said exposure setting means and being arranged to produce an electrical signal corresponding to information on the number of steps by which a photo taking lens mounted on the camera should be stopped down from its fully open aperture position;
   (e) diaphragm control means for controlling the operation of the diaphragm device corresponding to the computed value output of the diaphragm aperture value computing means;
   (f) reference signal producing means for producing a reference signal;
   (g) comparison means, said means being supplied with said electrical signal from said diaphragm aperture value computing means and said reference signal for comparison of these signals with each other to determine whether or not said signal from said computing means is less than zero and said comparison means being arranged to produce an electrical signal representative of the result of said comparison;

(h) oscillation means which generates pulses having a prescribed frequency;

(i) switching means, said means for controlling current supply to each means of the camera in response to the action for bringing the camera into an operative state;

(j) photographing action signal producing means which is electrically connected with the switching means, for producing a photographing action signal of the camera in response to close of the switching means;

(k) a logic circuit which receives as inputs thereof the output signal of the comparison means, the oscillation means and the photographing action signal producing means and generates a logic signal when the output signal of each of said means reaches a prescribed logic state; and (l) display means, which is connected to said logic circuit and displays by illumination, said logic signal in synchronism with the frequency of the oscillation means for producing a warning when a photographic condition falls outside an associated range of the camera.

11. A photographic camera adapted to have an interchangeable lens containing a diaphragm device mounted thereon and a signal containing a fully open aperture value information of said lens as input therein, comprising:

(a) a light measuring circuit for measuring light received from an object to be photographed;

(b) exposure condition setting means for supplying film sensitivity information and shutter time information;

(c) diaphragm aperture value computing means, said means being supplied with signals from said light measuring circuit and said exposure condition setting means and being arranged to produce an electrical signal corresponding to information concerning the number of steps by which said interchangeable lens should be stopped down from its fully open aperture position;

(d) diaphragm control means for controlling the operation of the diaphragm device corresponding to the output computation of the diaphragm aperture value computing means;

(e) lens information producing means having a converting means which provides as an output an electrical signal corresponding to a signal containing a fully open aperture value information of the interchangeable lens by mounting said lens to the camera;

(f) reference signal producing means which produces a reference signal;

(g) comparison means, said means being supplied with said electrical signal from said diaphragm aperture value computing means and said reference signal from said reference signal producing means for comparison of these signals with each other to determine whether or not said signal from said computing means is less than zero, said comparison means being arranged to produce an electrical signal representative of the result of said comparison;

(h) oscillation means which provides as an output pulses with a prescribed frequency;

(i) switching means which controls current supply to each means of the camera in response to an action for bringing the camera into an operative state; and (j) photographing action signal producing means which is electrically connected with the switching means for producing a photographing action signal of the camera in response to close of the switching means;

(k) photographing mode display means, comprising:

(1) a logic circuit which has outputs of the comparison means, the oscillation means and the photographing action signal producing means supplied thereto to produce a signal when the output signal of each means has entered into a certain determined logic state; and (2) mode display means which displays a signal of the logic circuit in synchronism with the frequency of the oscillation means.

12. A photographic camera according to claim 11 in which said mode display means is positioned to be visible within a view finder of the above camera.

13. A photographic camera adapted to have an interchangeable lens containing a diaphragm device mounted thereon and a signal containing a fully open aperture value information of said lens supplied as an input thereto, comprising:

(a) a light measuring circuit for measuring light received from an object to be photographed;

(b) exposure condition input means for supplying film sensitivity information and shutter time information;

(c) diaphragm aperture value computing means, said means being supplied with signals from said light measuring circuit and said exposure condition input means and being arranged to produce an electrical signal corresponding to information concerning the number of steps by which said interchangeable lens mounted on the camera should be stopped down from its fully open aperture position;

(d) diaphragm control means for controlling the operation of the diaphragm device corresponding to the output computation of the diaphragm aperture value computing means;

(e) reference signal producing means which produces a reference signal;

(f) comparison means, said means being supplied with said signal from said diaphragm aperture value computing means and said reference signal for comparison of these signals with each other to determine whether or not said signal from the computing means is less than zero and said comparison means being arranged to produce an electrical signal representing the result of said comparison;

(g) oscillation means which generates a pulse signal having a prescribed frequency;

(h) switching means which controls current supply to the light measuring circuit, the computing means, the comparison means and the oscillation means in response to a photo taking action of the camera and which generates a photo taking action signal; and (i) photographing mode display means, said means being supplied with the signal of said comparison means and being arranged to display in response to the oscillation cycle of said oscillation means the unsuitableness of the combination of said camera and said interchangeable lens in use.

14. A camera according to claim 13, in which said photographing mode display means is positioned to be visible within a view finder of the camera.

15. A photographic camera having a photographing mode display device and an interchangeable lens, including:

(a) an interchangeable lens which has a diaphragm device and a scale for manually setting a diaphragm aperture value and automatic setting marks at an external ring part of the lens, and further has a change-over means to show a selected automatic or manual photographing mode; and (b) a photographic camera body, which is adapted to have an interchangeable lens mounted thereon and which camera has a photographing mode display device to display a photographing mode by selection of manual and automatic modes, comprising:

(1) photographing mode signal generation means which detects an output of the change-over means at the lens side and provides as an output a photographing mode signal corresponding to a manual photographing mode or an automatic photographing mode corresponding to a change-over action of the photographing mode at the lens side;

(2) switching means, said means for controlling the supply of current to each means of the camera in response to the action for bringing the camera into an operative state, and which generates a photo taking preparation signal in response to closing action of the switching means;

(3) oscillation means which produces pulses of a certain determination frequency;

(4) a logic circuit which receives as inputs said photographing mode signal, a photo taking action preparation signal and an output signal of the oscillation means in response to the preparatory action for photo taking action of the camera and generates a logic signal when the output signal of each means reaches a prescribed logic state; and (5) photographing mode display means which makes an illumination display for a manual photographing mode of the camera by said logic signal.

16. A photographic camera in accordance with claim 15 wherein the further display means is a light emitting diode.

17. A photographic camera in accordance with claim 16 wherein the light emitting diode is arranged in the view finder in such a manner that the light emitting state of the diode is visually recognizable.

18. A photographic camera having a photographing mode display device, comprising the following arrangement:

(a) a photographing lens which has a diaphragm device and a change-over means for showing a photographing mode by change-over selection of automatic photographing and manual photographing;

(b) photographing mode signal generation means which detects an output of said change-over means and provides as an output a photographing mode signal which corresponds to a manual or automatic photographing mode corresponding to a change-over action of photographing mode at the lens side;

(c) oscillation means which generates pulse signals having a prescribed frequency;

(d) switching means which controls current supply to said signal generation means and the oscillation means in response to a photo taking action of the camera and generates a photo taking preparation signal in response to the switching action of the switching means;

(e) a logic circuit, which supplies as an input the above photographing mode signal, pulse signal and photo taking preparation signal in response to a preparatory action for the photo taking operation of the camera and provides as an output a logic signal when the signal of each means reaches a prescribed logic state; and (f) photographing mode display means which makes an illumination display of a manual photographing mode of the camera by said logic signal of the logic circuit.

19. A photographic camera according to claim 18, in which a photographing mode display means is positioned to be visible within a view finder for viewing an object.

20. A photographic camera adapted to have an interchangeable lens having the following mounted thereon:

(a) a diaphragm device;

(b) signal means which displays a signal corresponding to a fully open aperture value of the lens; and (c) change-over means which generates a selection signal by change-over selection of a photographing mode for manual photography or for automatic photography;

wherein said photographic camera adapted to have said interchangeable lens mounted thereon, has:

(1) light measuring means for receiving light reflected from an object to be photographed to measure brightness of said object;

(2) exposure information input means which supplies and sets film sensitivity information and shutter time information; and (3) calculating means, said means being supplied with signals from said light measuring means and said exposure information input means and being arranged to produce an electrical signal corresponding to information on the number of steps by which said interchangeable lens mounted on the camera should be stopped down from its fully open aperture position, wherein said camera further comprises:

(a) reference signal producing means which produces a reference signal;

(b) comparison means, said means being supplied with signals from said calculating means and said reference signal producing means for comparison of these signals with each other to determine whether or not said signal from the computing means is less than zero and said comparison means being arranged to produce an electrical signal representing the result of said comparison;

(c) photographing mode signal generation means which detects a selection signal of the change-over means at the interchangeable lens side and provides as an output a photographing mode signal corresponding to a manual or automatic photographing mode depending on a change-over action of a photographing mode at the lens side;

(d) oscillation means which generates a pulse signal with a prescribed frequency;

(e) switching means, said means for controlling current supply to each means of the camera in response to the action for bringing the camera into an operative state;

(f) photographing action signal producing means which is electrically connected with the switching means, and which produces a photographing action signal of the camera in response to close of the switching means;

(g) a first logic circuit which has as inputs the signals of the comparison means, the oscillation means and the photographing action signal producing means and provides as an output a logic signal in synchronism with an oscillation cycle of the oscillation means when the output signal of each of said means reaches a prescribed logic state;

(h) a second logic circuit which has as inputs the signals of the photographing mode signal generation means, the oscillation means and the photographing action signal producing means, and provides as an output a logic signal in synchronism with an oscillation cycle of the oscillation means when the output signal of each of said means reaches a prescribed logic state;

(i) first display means which is connected to said first logic circuit and has a display means to display by illumination a warning when a photographic condition falls outside an associated range of the camera by a logic signal of the logic circuit; and (j) second display means which is connected with said second logic circuit and has a display means to display by illumination a manual photographing mode of the camera by a logic signal of the logic circuit.

21. A photographic camera according to claim 20 wherein the first and second display means are arranged to be visible within a view finder of the camera.

22. A photographic camera according to claim 20, which further comprises:
(a) lens information producing means, having a converting means which provides as an output an electrical signal which corresponds to a signal of said signal means upon mounting the interchangeable lens on the camera;
(b) absolute diaphragm aperture value calculating means which inputs output signals of the calculating means and the lens information producing means and calculates an absolute diaphragm aperture value information; and
(c) third display means which is connected to the absolute diaphragm aperture value calculating means and is arranged in such manner that the calculation information is visually recognizable in a view finder.

23. A photographic camera according to claim 22, in which the first and second display means are arranged to be visual within a view finder.

24. A photographic camera according to claim 20, which further comprises:
(a) second switching means which responds to a photo taking action of the camera and is so controlled as being closed after the above switching means is closed; and
(b) display prohibiting means which has a semiconductor switching means being electrically connected between the second switching means and the first and second logic circuits, and outputs a signal to prohibit an illumination display of the first and second display means through the first and second logic circuits corresponding to a closing of the second switching means.

25. A photographic camera according to claim 24, which further comprises:
automatic exposure control means, which has a diaphragm control means to regulate the diaphragm device based on an output of the calculating means and a shutter time control means being actuated according to information of the exposure information input means, and is connected to the second switching means to have current supply thereto controlled according to a closing action of said second switching means; and wherein current is supplied to the automatic exposure control means by the second switching means which is closed by the photo taking action of the camera to conduct an exposure control of the camera, and the action of the first and second display means is prevented while the automatic exposure control means is in operation.

26. A photographic camera having a display means and an interchangeable lens with the following arrangement:
(a) an interchangeable lens having a diaphragm device and an associating member to control the diaphragm device depending on a signal from the camera, comprising:
  (1) signal means to denote a signal corresponding to a fully open aperture value of the lens; and
  (2) change-over means to generate a selected signal by a change-over selection of a photographing mode of a manual photography or an automatic photography; and
(b) a photographic camera which can have said interchangeable lens mounted thereon, comprising:
  (1) light measuring means for receiving light reflected from an object to be photographed to measure brightness of said object;
  (2) exposure information input means which supplies and sets film sensitivity information and shutter time information;
  (3) calculating means, said means being supplied with signals from said light measuring circuit and said exposure information input means and said calculating means being arranged to produce an electrical signal corresponding to information on the number of steps by which said interchangeable lens mounted on the camera should be stopped down from its fully open aperture position;
  (4) reference signal producing means which produces a reference signal;
  (5) automatic exposure control means having:
    (i) first comparison means which has a second converting means generating an electrical signal corresponding to an amount of shifting of said associating member which is shifted in response to photo taking action of the camera and a first comparison means for comparing output signals of said second converting means and the calculating means, and provides as an output a control signal when said both signals coincide with each other;
    (ii) diaphragm aperture control means which checks the said associating member based on the generation of the control signal of the first comparison means and controls the diaphragm device to such value as corresponding to the computation result of the calculating means through said associating member; and
    (iii) shutter time control means which controls a shutter time based on a set shutter time information from the exposure information input means;
  (6) second comparison means, said means being supplied with the output signal of said calculating means and said reference signal for comparison of these signals with each other to determine whether or not said output signal of the calculating means is less than zero and said comparison means being arranged to produce an electrical signal representing the result of said comparison;
(7) oscillation means which generates pulse signals with a prescribed frequency;
(8) first switching means which is closed in response to a photo taking action of the camera and controls current supply to the calculating means, the lens information producing means, the second comparison means and the oscillation means;
(9) photographing action signal producing means which is electrically connected with the first switching means, and which produces a photographing action signal of the camera in response to close of the first switching means;
(10) photographing mode signal generation means which has a detection means to detect a selection signal of the change-over means at the interchangeable lens side and a semiconductor switching means to provide as an output a photographing mode signal which corresponds to change-over action for manualautomatic photography at the lens side based on a detection signal of said detection means;
(11) a first logic circuit to which is supplied as inputs the output signal of each of the second comparison means, the oscillation means and the photographing action signal producing means and provides as an output a logic signal in synchronism with an oscillation cycle of the oscillation means when said each output signal reaches a prescribed logic state;
(12) a second logic circuit to which is supplied as inputs the output signal of each of the semiconductor switching means of the photographing mode signal generation means, the oscillation means and the photographing action signal producing means and provides as an output a logic signal in synchronism with an oscillation cycle of the oscillation means when each of said output signal reaches a prescribed logic state;
(13) first display means having a display means which is connected to said first logic circuit and provides an illumination display of a warning when a photographic condition falls outside an associated range of the camera by the logic signal of said logic circuit;
(14) second display means having a display means which is connected to said second logic circuit and makes an illumination display for a manual photographing mode of the camera by the logic signal of said logic circuit; and
(15) second switching means which is closed in association with the closing of the first switching means corresponding to a photo taking action of the camera and controls current supply to the automatic exposure control means according to said closing action and at the same time supplies a signal to prohibit said illumination displays of the first and second display means into said first and second circuit by the output signal of the photographing action signal producing means.

27. A photographing mode display device according to claim 26, further comprising:
(a) lens information producing means having a converting means which provides as an output an electrical signal corresponding to an output of the signal means by mounting the interchangeable lens to the camera;
(b) absolute aperture value calculating means which has fully open F value information of the lens and a calculation information from the calculating means supplied thereto and produces an absolute aperture value information; and
(c) aperture value indication means which is connected to the absolute aperture value calculating means and is arranged so that the calculation information is visually recognizable in a view finder.

28. A photographic camera which is adapted to have an interchangeable lens, having the following three components mounted thereon:
(a) a diaphragm device and an associating device to control the diaphragm device according to a signal from the camera side;
(b) output means to denote a signal which corresponds to a fully open aperture value of the lens; and
(c) change-over means which generates a selection signal by a change-over selection of photographing mode for a manual photo taking or an automatic photo taking;
wherein said camera comprises:
(1) light measuring means for receiving a light reflected from an object to be photographed so as to measure brightness of said object;
(2) exposure information input means which supplies and sets film sensitivity information and shutter time information;
(3) calculating means, said means being supplied with signals from said light measuring means and said exposure information input means and being arranged to produce an electrical signal corresponding to information on the number of steps by which said interchangeable lens mounted on the camera should be stopped down from its fully open aperture position;
(4) lens information producing means having a first converting means which provides as an output an electrical signal corresponding to an output of the signal means by mounting the interchangeable lens to the camera;
(5) automatic exposure control means, having:
(i) first comparison means which has a second converting means generating an electrical signal corresponding to an amount of shifting of said associating member which is shifted in response to a photo taking action of the camera and first comparison means to compare output signals of said second converting means and the calculating means, and provides as an output a control signal when said both signals coincide with each other;
(ii) diaphragm aperture control means which checks said associating member based on the generation of the control signal of the first comparison means and controls the diaphragm device to a value which corresponds to the computation result of the calculating means through said associating member; and
(iii) shutter time control means which controls a shutter time based on a set shutter time information from the exposure information input means;
(6) reference signal producing means which produces a reference signal;
(7) second comparison means, said means being supplied with the output signal of said calculating means and said reference signal for comparison of these signals with each other to determine whether or not said output signal of the calculating means is less than zero and said second comparison means being arranged to produce an electrical signal representing the result of said comparison;
(8) oscillation means which generates a pulse signal with a prescribed frequency;
(9) first switching means which is closed in response to a photo taking action of the camera and controls current supply to the calculating means, the lens information producing means, the second comparison means and the oscillation means;
(10) photographing action signal producing means which is electrically connected with the first switching means, and which produces a photographing action signal of the camera in response to close of the first switching means;
(11) photographing mode signal generation means which has a detection means to detect a selection signal of the change-over means at the interchangeable lens side and a semiconductor switching means to provide as an output a photographing mode signal corresponding to a change-over action for manualautomatic photo takings at the lens side based on a detection signal of said detection means;
(12) a first logic circuit to which is supplied as inputs the output signal of each of the second comparison means, the oscillation means and the photographing action signal producing means and provides as an output a logic signal in synchronism with an oscillation cycle of the oscillation means when each output signal reaches a prescribed logic state;
(13) a second logic circuit to which is supplied as inputs the output signal of each of the semiconductor switching means of the photographing mode signal generation means, the oscillation means and the photographing action signal producing means and provides as an output a logic signal in synchronism with an oscillation cycle of the oscillation means when each output signal reaches a prescribed logic state;
(14) first display means having a display means which is connected to said first logic circuit and provides illumination display of a warning for when a photographic condition falls outside of an associated range of the camera by the logic signal of said logic circuit;
(15) second display means having a display means which is connected to said second logic circuit and provides illumination display for a manual photographing mode of the camera by the logic signal of said logic circuit; and
(16) second switching means which is closed in association with the closing of the first switching means corresponding to a photo taking action of the camera and controls current supply to the automatic exposure control means according to said closing action and at the same time inputs a signal to prohibit said illumination displays of the first and second display means into said first and second circuits by the output signal of the photographing action signal producing means.

29. A photographic information alarm device for a camera which is adapted to have an interchangeable lens containing a diaphragm device therein, the camera in combination with said interchangeable lens comprising:
(a) a diaphragm device which can be changed over between an automatic photographing mode and a manual photographing mode;
(b) light measuring means which receives a reflection light from an object to be photographed through the maximum aperture of said diaphragm device;
(c) exposure condition setting means for supplying film sensitivity information and shutter time information;
(d) diaphragm aperture value computing means for computing a diaphragm aperture value based on exposure condition setting information from said exposure condition setting means and brightness information from said light measuring circuit;
said photographic information alarm device including:
(1) detecting means, said means being supplied with information concerning the computed diaphragm aperture value from said diaphragm aperture value computing means to detect whether said diaphragm device is capable of or incapable of being operated into a proper exposure condition in accordance with said information on the computed aperture value, and said detecting means being arranged to produce a detecting signal upon detection of incapability of the diaphragm device;
(2) oscillation means which generates pulses having a prescribed frequency; and
(3) alarm display means having an alarm display element, said means being connected to said detecting means and to said oscillation means to cause said display element to make a flickering display in response to said detection signal from said detecting means and in synchronism with the pulses from said oscillation means.

30. A photographing mode display device for a camera which is adapted to have an interchangeable lens containing a diaphragm device therein, the camera in combination with said interchangeable lens comprising:
(a) a diaphragm device which can be changed over between an automatic photographing mode and a manual photographing mode;
(b) a light measuring circuit which receives a light reflected from an object to be photographed to measure the brightness of the object;
(c) exposure condition setting means, said means being supplied with film sensitivity information and shutter time setting information; and
(d) diaphragm aperture value computing means for computing a diaphragm aperture value based on exposure condition setting information from said exposure condition setting means and brightness information from said light measuring circuit;
the photographing mode display device including:
(1) oscillation means which produces pulses of a certain predetermined frequency;
(2) photographing mode change-over means, said means being operatively associated with a change-over operation on said diaphragm device between said automatic and manual photographing modes and being arranged to produce a mode change-over signal in response to said change-over operation;
(3) a logic circuit which receives the output pulse signal of said oscillation means and said mode change-over signal from said change-over means, said logic circuit being arranged to produce a logic signal when the output signal of each of said means reaches a prescribed logic state; and
(4) photographing mode display means provided with an illumination element connected to said logic circuit, said means being arranged to cause said illumination element to make a flickering display of a photographing mode selected through a change-over action of said photographing mode change-over means, said flickering display being effected in accordance with the cycle of said logic state.

31. A photographing mode display device for a camera having:
(a) an interchangeable lens with a diaphragm device which can be changed over between the automatic photographing mode and the manual photographing mode and having a signal means for showing a signal containing fully open aperture value information of the lens;
(b) light measuring means for receiving the light reflected from the object to be photographed so as to measure the brightness of the object to be photographed;
(c) exposure information input means, said means setting and supplying the film sensitivity information and the shutter time information; and
(d) calculating means, said means being supplied with signals from said light measuring means and said exposure information input means for producing an electrical signal corresponding to information concerning the number of steps by which said interchangeable photo taking lens should be stopped down from a fully open aperture position thereof, said camera comprising:
  (1) reference signal producing means which produces a reference signal;
  (2) comparison means, said means being supplied with said electrical signal from said calculating means and said reference signal for comparison of these signals to determine whether or not the signal from said calculating means is below zero and to produce an electrical signal according to the result of the comparison;
  (3) oscillation means, said means producing pulses of a certain determined frequency;
  (4) photographing mode change-over means, said means producing the mode change-over signal in operative engagement with the change-over operation between the automatic photographing mode and the manual photographing mode by the diaphragm device;
  (5) switching means, said means for controlling the supply of current to each means of the camera in response to the action for bringing the camera into an operative state, and which generates a photographing action signal in response to closing action of the switching means; and
  (6) warning means for giving a warning relative to photographic information, said means being supplied with signals from said comparison means, said oscillation means and said switching means and being arranged to produce a warning signal when the aperture information calculated by said calculating means is not suitable for the maximum diaphragm aperture value of said photo taking lens mounted on the camera.

32. A photographing mode display device for a camera in accordance with claim 31 comprising:
(a) a first logic circuit, said circuit being supplied with the output of the switching means, the oscillation means and the photographing mode change-over means for producing a signal synchronized with the frequency of the oscillation means when the output signal of each above means has entered into a certain determined logic state; and
(b) first display means, said means being connected to the first logic circuit for effecting the light emitting display of the manual photographing mode in accordance with the above synchronization signal.

33. A photographing mode display device in accordance with claim 32 wherein the light emitting display is arranged to permit visual observation within a view finder of the camera.

34. A photographing mode display device in accordance with claim 31 comprising:
(a) an absolute diaphragm aperture value calculating means, said means being supplied with the fully open F value information of the lens and the calculation information from the calculating means for producing the absolute diaphragm aperture value information; and
(b) an absolute diaphragm aperture display means, said means being connected to the absolute diaphragm aperture value calculating means and arranged in such a manner that the calculation information is visually recognizable in the view finder.

35. A photographing mode display device in accordance with claim 31 wherein said warning means includes:
(a) a second logic circuit, said circuit being supplied with the output of the comparison means and the oscillation means for producing a signal synchronized with the frequency of the oscillation means when the output signal of each above means has entered into a certain determined logic state; and
(b) alarm display means connected to said second logic circuit to display a warning signal indicating unsuitability of the combination of the camera and the photo taking lens in use.

36. A photographing mode display device in accordance with claim 31 further comprising display prohibiting means provided with a switching means which operates in response to a photo taking operation of the camera to prohibit said warning signal from being produced by supplying a switching signal to said warning means.

* * * * *